United States Patent [19]

Sogoh

[11] Patent Number: 5,173,834
[45] Date of Patent: Dec. 22, 1992

[54] ELECTROSTATIC ATTRACTION APPARATUS

[75] Inventor: Kiyoshi Sogoh, Shizuoka, Japan

[73] Assignee: Roland DG Corporation, Shizuoka, Japan

[21] Appl. No.: 531,108

[22] Filed: May 31, 1990

[30] Foreign Application Priority Data

Jun. 2, 1989 [JP] Japan .................. 1-141637
Jul. 27, 1989 [JP] Japan .................. 1-88703[U]

[51] Int. Cl.$^5$ ............................. H02N 13/00
[52] U.S. Cl. .............................. 361/234; 269/8
[58] Field of Search ........... 361/230, 234, 212, 214; 269/8, 903; 250/492.2; 279/1 M

[56] References Cited

U.S. PATENT DOCUMENTS

| | | | |
|---|---|---|---|
| 3,634,740 | 1/1972 | Stevko | 361/234 |
| 3,717,801 | 2/1973 | Silverberg | 361/234 |
| 3,916,270 | 10/1975 | Wachtler et al. | 361/234 |
| 4,751,609 | 6/1988 | Kasahara | 361/234 |
| 4,864,461 | 9/1989 | Kasahara | 361/234 |

FOREIGN PATENT DOCUMENTS 57-58872 12/1982 Japan.
1043298 9/1966 United Kingdom ............. 361/234

Primary Examiner—Jeffrey A. Gaffin
Attorney, Agent, or Firm—Sandler, Greenblum & Bernstein

[57] ABSTRACT

An electrostatic attraction apparatus has circuitry for eliminating electrostatic charge. The circuitry has: (i) a short-circuiting mechanism for short circuiting a pair of conductors; and/or (ii) an impressed polarity-inverting mechanism for inverting the polarity of the DC voltage, or the voltage equivalent thereto, which is applied between the pair of conductors, and which is responsive to termination of the DC voltage applied between the pair of conductors from the voltage-generating means. Thereafter, an attracted body can be detached very easily from an attraction layer irrespective of the relaxation time, that is, the length of time required to extinguish the electrostatic charge.

20 Claims, 7 Drawing Sheets

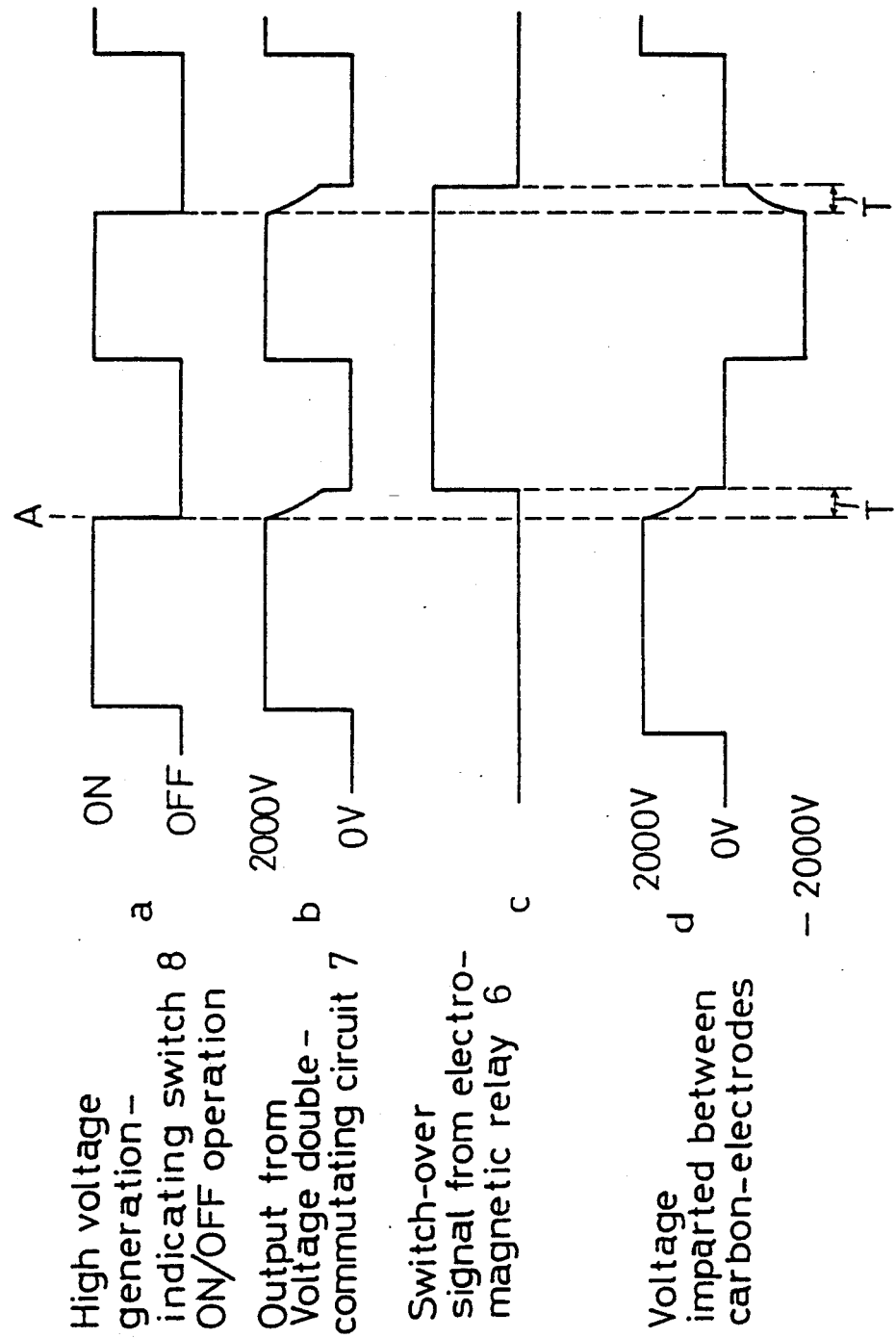

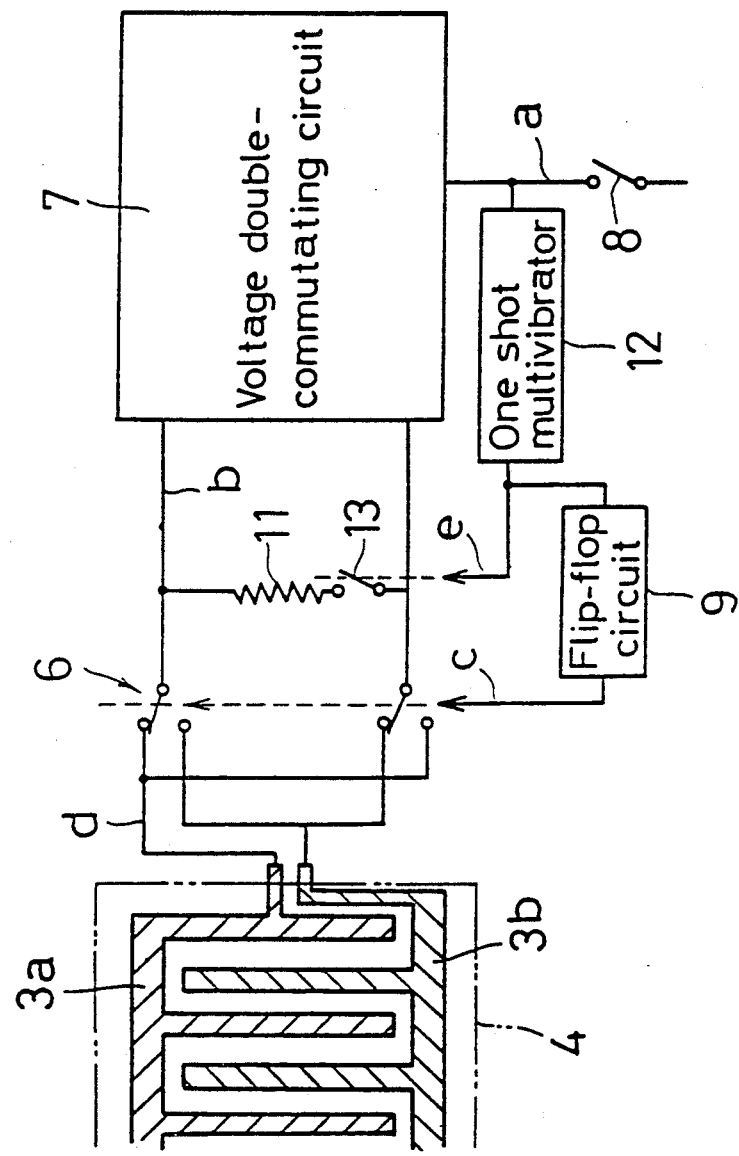

ELECTROSTATIC ATTRACTION APPARATUS

BACKGROUND OF THE INVENTION

1. Field of the Invention

The present invention relates to an electrostatic attraction apparatus having a pair of conductors arranged electrically separately in an attraction layer or on one side face thereof for attracting and holding a body positioned on the other side face of the attraction layer by an electrostatic attracting force by the DC voltage or the voltage equivalent thereto impressed between conductors of the pair of conductors.

2. Description of the Related Art

Conventionally, in this kind of electrostatic attraction apparatus, detachment is facilitated for an attracted body to be released from an attraction layer by removing the DC voltage or the voltage equivalent thereto, which has been applied between the conductors of a pair of conductors, as is disclosed in Japanese Patent Publication No. Sho. 57-58872(1982).

Even after the DC voltage or the voltage equivalent thereto is removed, the electrostatic charge generated by such a voltage attracts and holds the body on the attraction layer. In order to rapidly eliminate the electrostatic charge, or to shorten the relaxation time, an electric volume resistivity of a dielectric material constituting the attraction layer has to be below $10^{12}$ $\Omega$cm.

However, even though the electric volume resistivity of the dielectric material is lowered to shorten the relaxation time and to facilitate detachment of the attracted body from the attraction layer, a problem is encountered in that the electric volume resistivity of the dielectric material can only be reduced to that of the attracted body and the relaxation time can be shortened only within a certain range. This problem results because when the electric volume resistivity of the dielectric material is reduced below that of the attracted body, the potential difference based upon the DC voltage or the voltage equivalent thereto impressed is not created in the attracted body. Thus polarization is not formed and the electrostatic attracting force is not generated between the attraction layer and the attracted body.

SUMMARY OF THE INVENTION

It is an object of the present invention to provide an electrostatic attraction apparatus which is able to detach an attracted body from an attraction layer very easily, irrespective of the relaxation time.

The electrostatic attraction apparatus according to the invention comprises, an impressed voltage-generating device for generating the DC voltage or the voltage equivalent thereto which is to be applied between the pair of conductors, and a short-circuiting device for short circuiting between the pair of conductors in response to termination of the DC voltage, or the voltage equivalent thereto, which has been applied between the pair of conductors from the impressed voltage-generating device.

Another configuration of the invention, in lieu of the short-circuiting device, it is provided with:

impressed polarity-inverting means for inverting the unpressed polarity of the DC voltage or the voltage equivalent thereto between the pair of conductors, in response to termination of the DC voltage, or the voltage equivalent thereto, which has been applied between the pair of conductors from the impressed voltage-generating means.

Accordingly, by the forcible electric charge elimination by short-circuiting, or by elimination of the electrostatic charge generated by polarization in the attraction layer due to the electrostatic charge accumulated in the impressed voltage-generating means, by the forcible electric charge offset by inversion of the impressed polarity, the attracted body can be detached very easily from the attraction layer irrespective of the relaxation time. Since the invention is not directed to facilitate detachment of the attracted body by lowering the electric volume resistivity of the dielectric material, or by shortening the relaxation time, the facility of detachment or the adsorptivity after detachment are not affected by the temperature condition used.

Besides, since the facility of detaching the attracted body is not affected directly by the electric volume resistivity of the dielectric material, by raising the electric volume resistivity of the dielectric material preferably above $10^{13}$ $\Omega$cm to delay the build-up of the attracting and holding action, the attracted body can be easily positioned when attracted and held.

Furthermore, in the invention, the short-circuiting means and the impressed polarity inverting means may be combined to constitute impressed polarity inverting which, in response to elimination of the electric charge, which has been charged onto the attraction layer by the short circuiting effected by the short-circuiting means between the pair of conductors, inverts the impressed polarity of the DC voltage or the voltage equivalent thereto between the pair of conductors. In this configuration, since the impressed polarity inversion by the impressed polarity inverting means takes place after the elimination of the electric charge on the attraction layer, the polarity inverting means is operated at a very low voltage. Thus, a good reliability of the impressed polarity inverting means can be obtained, and a voltage withstand capacity need not be large. Similarly, since a resistance value of the discharge resistance in the short-circuiting means can be set freely, the time until the impressed polarity inverting means is reversed may be shortened by reducing the resistance value.

Meanwhile, where the impressed polarity inversion by the impressed polarity inverting means is delayed by using delaying means, the impressed polarity may be inverted at a suitable voltage value based upon the electrostatic capacity which decreases with time after the termination of the DC voltage or the voltage equivalent thereto which has been generated from the impressed voltage-generating means. Thus, the impressed polarity inverting means need not be operated at a high voltage but at a low voltage, so that a good reliability is insured, and the voltage withstand capacity need not be large.

It is noted that, in accordance with a particular aspect of the present invention, the polarity inverting means includes one of an electromagnetic relay, electrostatic relay, a thermal relay, and a piezo-electric relay.

BRIEF DESCRIPTION OF THE DRAWINGS

FIGS. 1 through 7 are drawings for explaining specific embodiments of an electrostatic attraction apparatus according to the present invention, in which FIGS. 1 and 2 are, respectively, an exploded perspective view and a sectional view showing the construction of an electrostatic attraction apparatus;

FIG. 3 is an electric circuit diagram of a first embodiment including short-circuiting means;

FIG. 4 shows wave-form time charts of respective portions in the electric circuits of the first and third embodiment, shown in FIGS. 3 and 7 respectively;

FIG. 5 is an electric circuit diagram of a second embodiment including impressed polarity inverting means;

FIG. 6 shows wave-form time charts of respective portions in the electric circuit of the second embodiment shown in FIG. 5; and FIG. 7 is an electric circuit diagram of the third embodiment in which the short-circuit means and impressed polarity inverting means are combined.

DETAILED DESCRIPTION OF THE PREFERRED EMBODIMENTS

A specific embodiment of an electrostatic attraction apparatus according to the present invention will be explained with reference to the drawings. In this embodiment, the electric volume resistivity and the specific inductivity are based upon tests according to JIS K6911, clauses 5-13 and 5-14.

Figure 1:
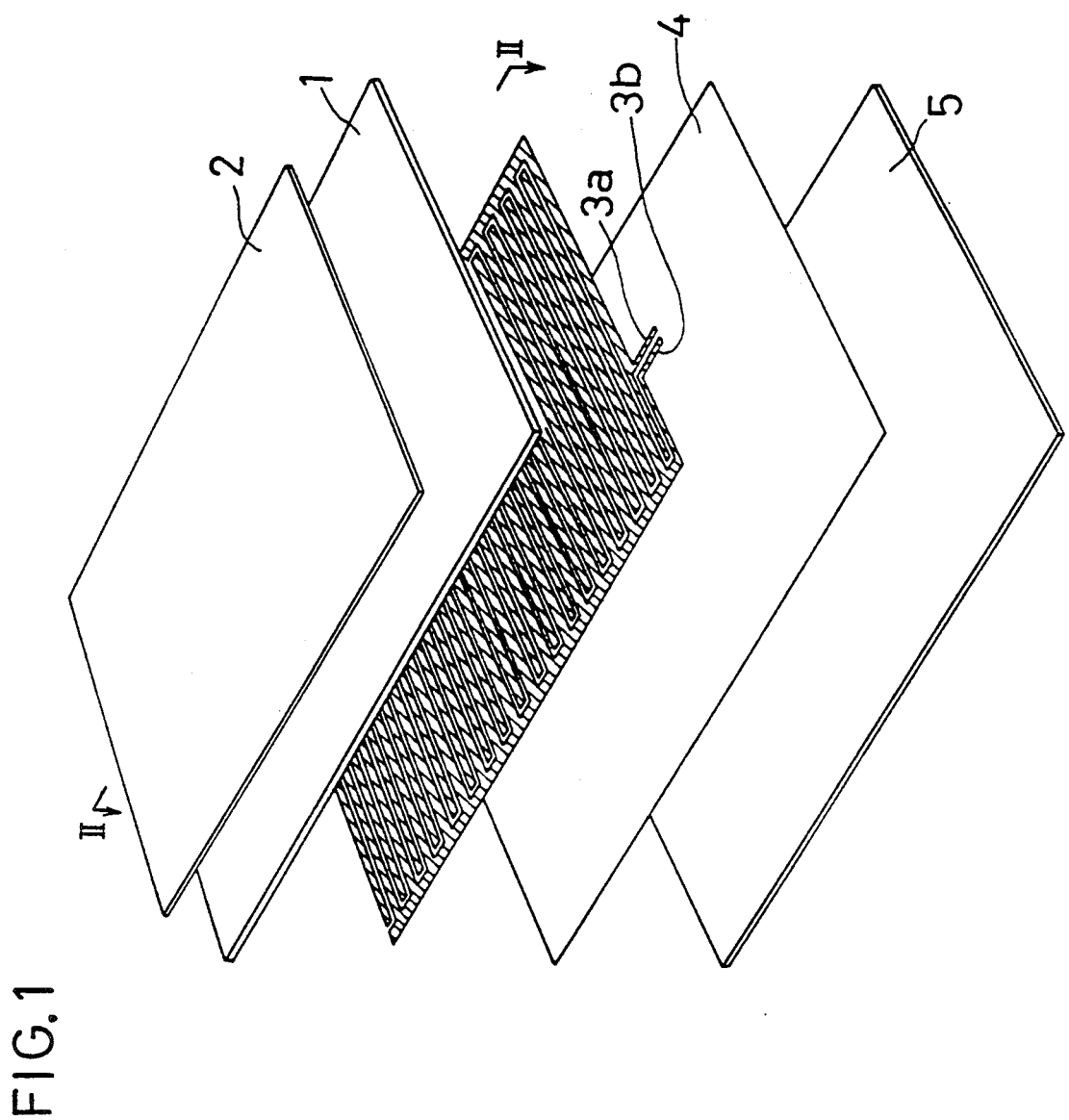
Figure 2:
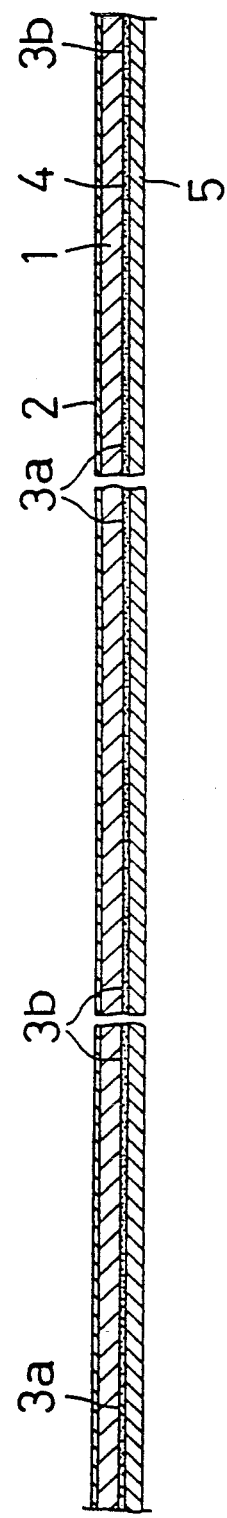

In FIGS. 1 and 2, on the upper surface of an attraction layer 1, a body 2 such as a paper sheet to be attracted and held by an electrostatic attracting force is placed. The attraction layer 1 has a thickness of about 300 μm, an electric volume resistivity of about $10^{14}$ to $10^{15}$ Ωcm and a specific inductivity of about 5.0 to 7.0. The attraction layer 1 is constituted by blending a conductive material such as carbon black and nickel with an acrylic ester, polyvinyl chloride, polyethylene terephthalate, or the like, or with a plurality of mixtures thereof. On the lower surface of the attraction layer 1, a pair of carbon electrodes 3a and 3b which are one example of an electric conductor of the invention are provided. Each has thickness of about 15 μm and a width of about 10 mm, and are disposed at about a 3 mm interval. The carbon electrodes 3a and 3b are formed by printing a carbon conductive ink, provided with the conductivity by blending conductive carbon with an olefin or acrylic binder, by means of a silk screen process or the like.

On the lower surface side of the attraction layer 1, or the carbon electrodes 3a and 3b, a supporting sheet 5 is laminated by adhesion via an insulating adhesive layer 4 having a thickness of about 30 to 50 μm and formed by bonding of an acrylic, olefin or epoxy synthetic resin adhesive. The supporting sheet 5, which has the thickness of about 250 μm, is constituted by a plastic material such as a polycarbonate, polyester or acrylic resin sheet.

As previously described, sections of the carbon electrodes 3a and 3b have a thickness of about 15 μm and a width of about 10 mm, and, as shown in FIG. 1, they are arranged in a comb-like zigzag pattern in parallel with each other at intervals of about 3 mm therebetween. Between the carbon electrodes 3a and 3b, in order to attract and hold the body by electrostatic attracting force, a high voltage (hereinafter referred to as "DC voltage") e.g., a DC voltage of about 2000 V in this embodiment or an equivalent half-wave rectification wave voltage, is applied.

EMBODIMENT 1

Figure 3:
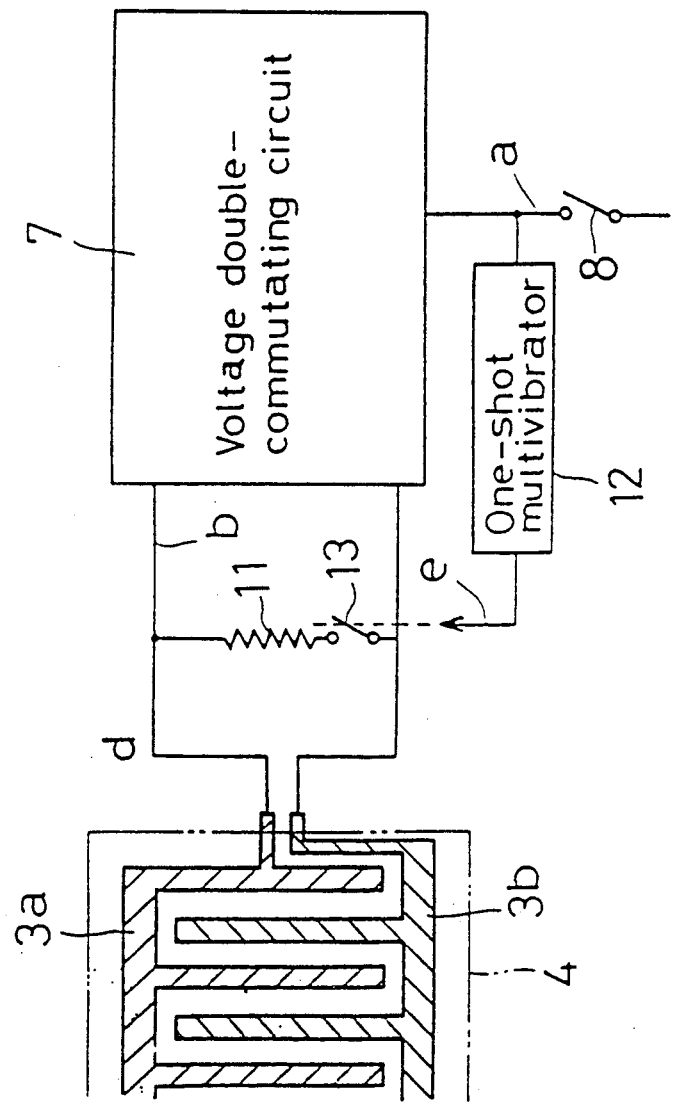
Figure 4:
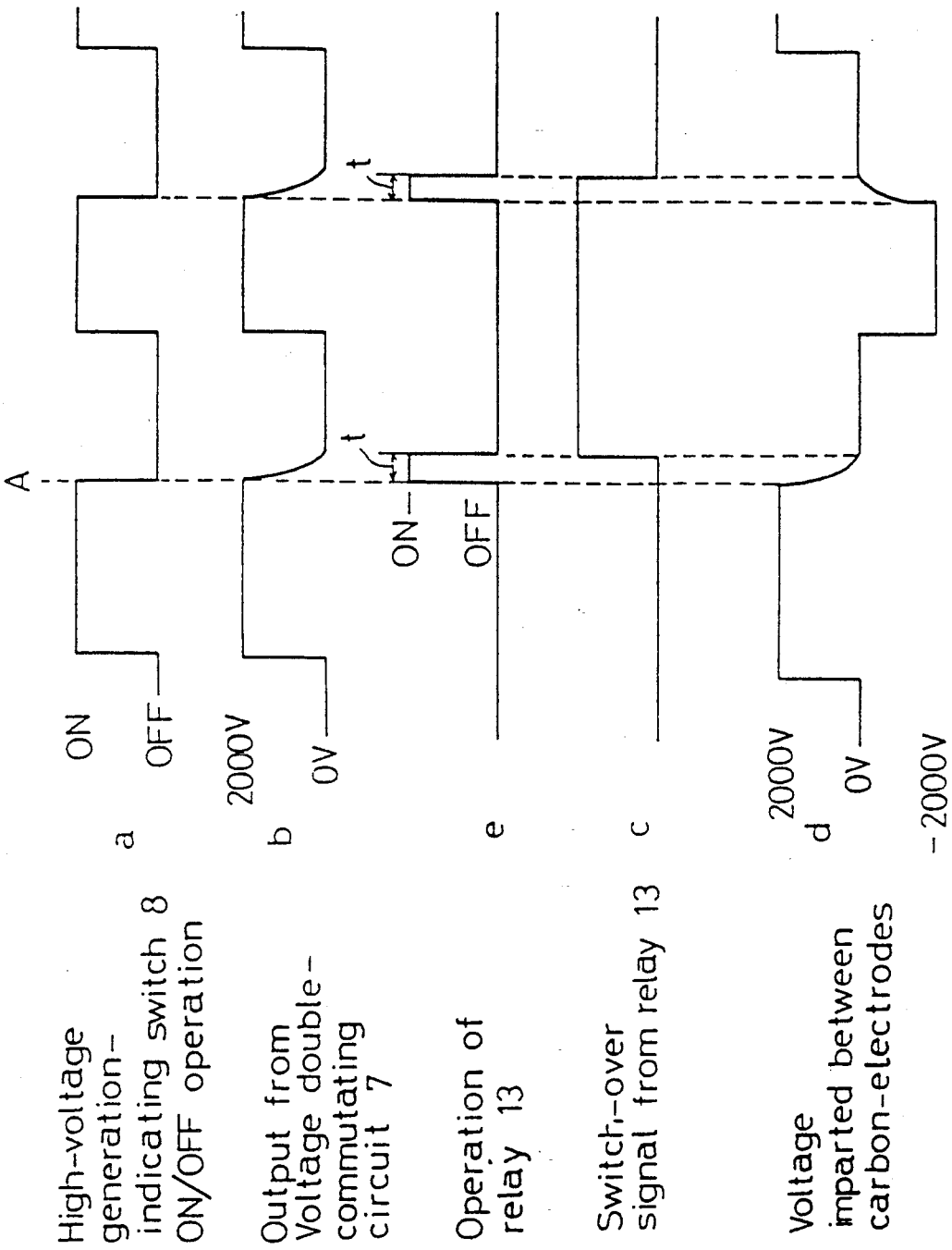

First, in accordance with the electric circuit of FIG. 3, the first embodiment will be explained with reference to the time chart of FIG. 4 showing operation wave forms of respective portions a, b, d and e of the electric circuit. Reference characters a, b, d and e in FIGS. 3 through 7 correspond with each other.

Between the carbon electrodes 3a and 3b, the 2000 V DC voltage, which is generated in a voltage double-commutating circuit 7, which is one example of impressed voltage-generating means of the invention and constituted by a rectifier and a capacitor, is impressed. The 2000 V DC voltage of the voltage double commutating circuit 7 is generated and terminated by the ON/OFF operation of a high-voltage generation indicating switch 8. Between an output line and a return line of the voltage double-commutating circuit 7, a discharge resistance 11 which discharges the electrostatic charge and a relay 13 which turns the discharge resistance 11 ON and OFF are disposed. A one-shot multivibrator 12, which controls the relay 13, is provided as a short-circuiting means of the invention. The one-shot multivibrator 12 is connected to the voltage double commutating circuit 7 side of the high voltage generation indicating switch 8 and is operated according to the operation of the latter.

By such a circuit configuration, when the high voltage generation indicating switch 8 is turned OFF, the voltage doubler commutating circuit 7 is also turned OFF. At the same time, the relay 13 is ON for a predetermined time t by the one-shot multivibrator 12. Therefore, when the high voltage generation indicating switch 8 is OFF, the electrostatic charge accumulated in the voltage doubler commutating circuit 7 and the attraction layer 1 itself is discharged through the discharge resistance 11. As shown in a time chart of FIG. 4, during the set time t of the one-shot multivibrator 12, the output voltage b of the voltage doubler commutating circuit 7 and the impressed voltage d between the carbon electrodes 3a and 3b become 0V, and the attraction layer 1 looses the electric charge to facilitate detachment of the attracted body 2.

It is noted that the first embodiment does not have means for inverting the polarity of the voltage which is applied to electrodes 3a and 3b. Accordingly, in the first embodiment the voltage d does not drop to −2000 V as indicated in FIG. 4. The voltage inversion is shown in FIG. 4 to illustrate the operation of the third embodiment of the invention, which will be more fully described hereinafter.

EMBODIMENT II

Figure 5:
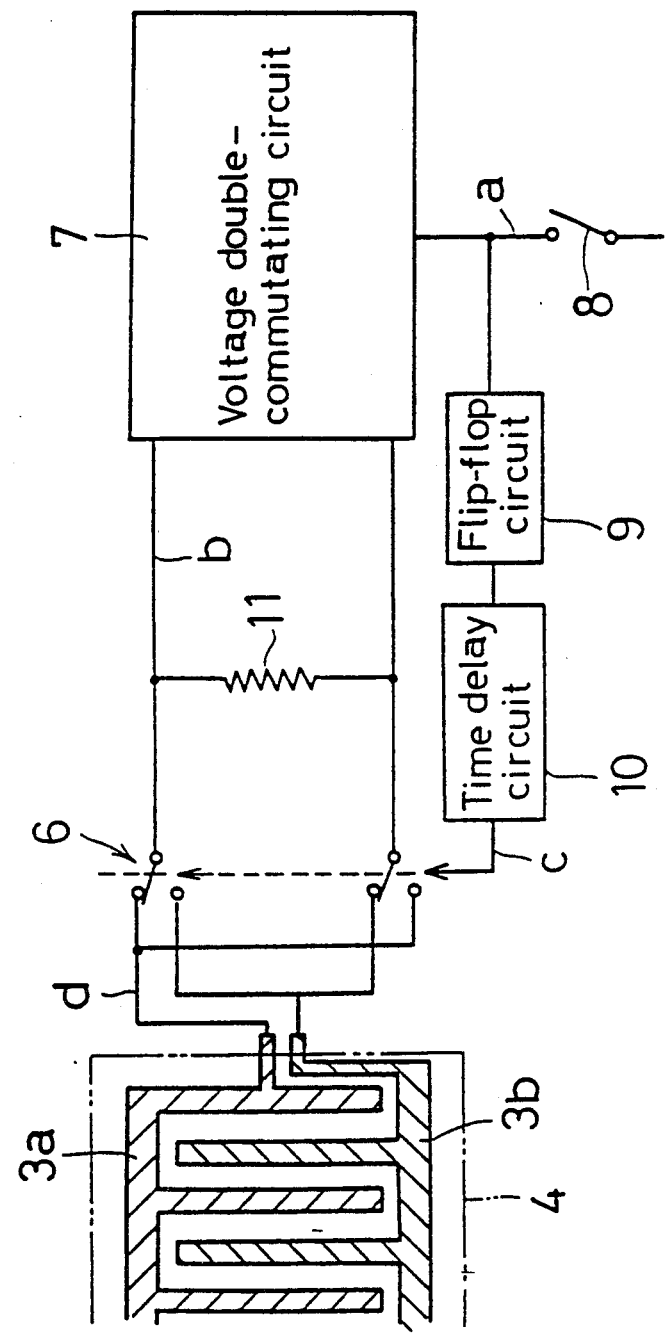

Now, an electric circuit having an impressed polarity inverting means of a second embodiment will be explained with reference to FIG. 5 and the time charts of FIG. 6 showing the operation wave form of respective portions a to d of the electric circuit.

Between the carbon electrodes 3a and 3b, there is applied the 2000 V DC voltage generated in the voltage doubler commutating circuit 7 via an electromagnetic relay 6 which is one example of the impressed polarity inverting means of the invention which inverts the DC voltage polarity applied between the carbon electrodes 3a and 3b. The 2000 V DC voltage of the voltage doubler commutating circuit 7 is generated and stopped by the ON/OFF operation of the high voltage generation indicating switch 8, whose OFF operation inverts the state of a flip-flop (F.F.) circuit 9 having the function as a 1-digit binary counter. The output signal from the F.F.ciurcuit 9, acting as a relay switching signal, is delayed by a predetermined time T by a time delay circuit 10, and is given to the electromagnetic relay 6 thereafter. The time delay circuit 10A is one example of a delaying means of the invention, and is constituted by a delay line. The electromagnetic relay 6 is switched by the delayed output signal, and then the impressed polarity between the carbon electrodes 3a and 3b is inverted. Incidentally, the discharge resistance 11 used in the second embodiment has a high resistance of, for example, 70M Ω and discharges the electrostatic charge accumulated in the voltage doubler commutating circuit 7 having an electrostatic capacity with a predetermined time constant. By selecting a resistance value of the discharge resistance 11, the wave form of the output potential, which is attenuated in accordance with the time constant of the voltage doubler commutating circuit 7, after the OFF operation of the high voltage generation indicating switch 8 can be adjusted.

According to the embodiment, at time point A after a predetermined delay time T from the OFF operation of the high voltage generation indicating switch 8, the impressed polarity to the carbon electrodes 3a and 3b is inverted, and the electrostatic charge generated by polarization in the attraction layer 1 is offset and extinguished instantly by the electrostatic charge accumulated in the voltage doubler commutating circuit 7, thereby eliminating the polarization instantly and detaching the attracted body at once. As the electromagnetic relay 6 is changed over after the output potential of the voltage doubler commutating circuit 7 is decreased, the voltage withstand capacity of the electromagnetic relay 6 need not be large.

EMBODIMENT III

According to a third embodiment of the present invention, as shown in FIG. 7, an impressed polarity inverting means of the second embodiment is added to an electric circuit of the first embodiment. That is, between the carbon electrodes 3a and 3b, the DC voltage is applied from the voltage doubler commutating circuit 7 via the electromagnetic relay 6, which is switched by the inversion of the state of the flip-flop (F.F.) circuit 9 (having the function as a 1-digit binary counter, and which is operated by the OFF operation of the high voltage generation indicating switch 8 via the one-shot multivibrator 12 in the first embodiment). Thus, in this embodiment, when the high voltage generation indicating switch 8 is turned OFF, the voltage doubler commutating circuit 7 is OFF. At the same time, by the one-shot multivibrator 12, as previously stated, the electrostatic charge, which is charged between the carbon electrodes 3a and 3b and also onto the attraction layer by the operation of the discharge resistance 11, is generally extinguished for a predetermine time t. Then, with the fall of the one-shot multivibrator 12, the signal is sent to the F.F. circuit 9 to operate the electromagnetic relay 6, thereby inverting the impressed polarity. When the electromagnetic relay 6 is switched, the impressed voltage between the carbon electrodes 3a and 3b is lowered to a minimum value close to 0V by the extinction of the electrostatic charge, so that arcs of the electromagnetic relay 6 will never deteriorate life or cause noises.

In the first and third embodiments, as an example the discharge resistance 11 which discharges the electrostatic charge is set at 4.7M Ω falling within and selected from the range of 0.47 to 100M Ω, and the time t during which the relay 13 is ON for discharge is set at 500 m sec. The fact that the time during which the relay 13 is ON, or the discharging time can be set arbitrarily is advantageous in shortening the time before which the electromagnetic relay 6 which inverts the impressed voltage is switched, after turning OFF the high voltage generation indicating switch 8 in the third embodiment.

In the second and third embodiments, though the electromagnetic relay 6 is used as the impressed polarity inverting means, an electrostatic relay, a thermal relay, a piezo-electric relay or the like may also be used. Also, though the voltage doubler commutating circuit 7 is used as the impressed voltage-generating means, a high voltage-generating circuit comprising a semiconductor, a silicon control element, a booster transformer or the like may be used.

In all the embodiments, although the attraction layer 1 is to have an electric volume resistivity of about $10^{14}$ to $10^{15}$ Ωcm and a specific inductivity of 5.0 to 7.0, the numerical ranges are not necessarily limited thereto to obtain the same electrostatic attracting force and the detaching operation and effect. For example, the electric volume resistivity may be within the range of about $10^8$ to $10^{17}$ Ωcm and the specific inductivity in the range of about 3.0 to 12.0. However, when the electric volume resistivity is set above $10^{13}$ Ωcm, the attracted body 2 can be easily positioned when attracted and held, due to the delay of build-up of the attracting and holding action of the attraction layer 1. Furthermore, though the discharging resistance 11 is made in the embodiment as an external resistance relative to the voltage doubler commutating circuit 7, it may be an internal resistance. The values of volume resistivity and specific inductivity may be determined by test performed in accordance with the 1989 Japanese Industrial Handbook for Plastics, JIS K6911, clause 5-13.

What is claimed is:

1. An electrostatic attraction apparatus having a pair of spaced conductors in an attraction layer for attracting and holding an attracted body positioned on said attraction layer, by an electrostatic attracting force induced by a voltage applied between the pair of conductors, said electrostatic attraction apparatus comprising:
    (a) voltage generating means for generating said voltage applied between said pair of conductors, and
    (b) eliminating means for eliminating the electrostatic attracting force in response to termination of the applied voltage, said eliminating means further comprising short-circuiting means for short-circuiting said pair of conductors to terminate said applied voltage.

2. An electrostatic attraction absorption apparatus in accordance with claim 1, wherein said short-circuiting means comprises a discharge resistance.

3. The electrostatic attraction apparatus in accordance with claim 2, wherein the discharge resistance has a resistance value within a range from 0.47 to 100MΩ.

4. The electrostatic attraction apparatus in accordance with claim 1 wherein said eliminating means comprises polarity inverting means for inverting the polarity of the said voltage between said pair of conductors.

5. The electrostatic attraction apparatus in accordance with claim 4 further comprising delay means for delaying the start of operation of said polarity inverting means until after the start of operation of said short-circuiting means.

6. The electrostatic elimination apparatus in accordance with claim 1, further comprising delay means for delaying the elimination of the electrostatic attracting force by said eliminating means.

7. The electrostatic elimination apparatus according to claim 6 wherein said delay means is a time delaying circuit.

8. The electrostatic elimination apparatus according to claim 1, wherein said voltage generating means is a voltage double communicating circuit.

9. The electrostatic elimination apparatus in accordance with claim 1, wherein said attraction layer comprises a dielectric material having an electric volume resistivity of at least $10^{13}$ $\Omega$cm.

10. The electrostatic elimination apparatus according to claim 1, wherein said attraction layer comprises a dielectric material having the electric volume resistivity of at least $10^{13}$ to $10^{17}$ $\Omega$cm.

11. The electrostatic elimination apparatus in accordance with claim 1 wherein said attraction layer comprises a dielectric material having a specific inductivity of 3.0 to 12.0.

12. The electrostatic elimination apparatus in accordance with claim 1 wherein said polarity inverting means is a relay elected from the group consisting of an electromagnetic relay, an electrostatic relay, a thermal relay and a piezo-electric relay.

13. An electrostatic attraction apparatus having a pair of spaced conductors, arranged in an attraction layer for attracting and holding an attracted body positioned on said attraction layer, by an electrostatic attracting force induced by a voltage applied between the pair of conductors, said electrostatic attraction apparatus comprising:

(a) voltage generating means for generating said voltage applied between said pair of conductors, and (b) polarity inverting means for inverting the polarity of the voltage applied between the said pair of conductors, in response to the termination of said applied voltage.

14. The electrostatic attraction apparatus in accordance with claim 13, further comprising delay means for delaying the inversion of the polarity by said polarity inverting means.

15. The electrostatic attraction apparatus in accordance with claim 14, wherein said delay means is a time delaying circuit.

16. The electrostatic attraction apparatus in accordance with claim 13, wherein said voltage generating means is a voltage double-communicating circuit.

17. The electrostatic attraction apparatus in accordance with claim 13, wherein said attraction layer comprises a dielectric material having an electric volume resistivity of at least $10^{13}$ $\Omega$cm.

18. The electrostatic attraction apparatus in accordance with claim 13, wherein said attraction layer comprises a dielectric material having an electric volume resistivity of at least $10^{13}$ to $10^{17}$ $\Omega$cm.

19. The electrostatic attraction apparatus in accordance with claim 13, wherein said attraction layer comprises a dielectric material having a specific inductivity of 3.0 to 12.0.

20. The electrostatic elimination apparatus in accordance with claim 13 wherein said polarity inverting means is a relay elected from the group consisting of an electromagnetic relay, an electrostatic relay, a thermal relay and a piezo-electric relay.

* * * * *